Dec. 26, 1944.   R. D. McLEOD   2,365,892
SPEED CONTROL VALVE
Filed June 14, 1943   2 Sheets-Sheet 1
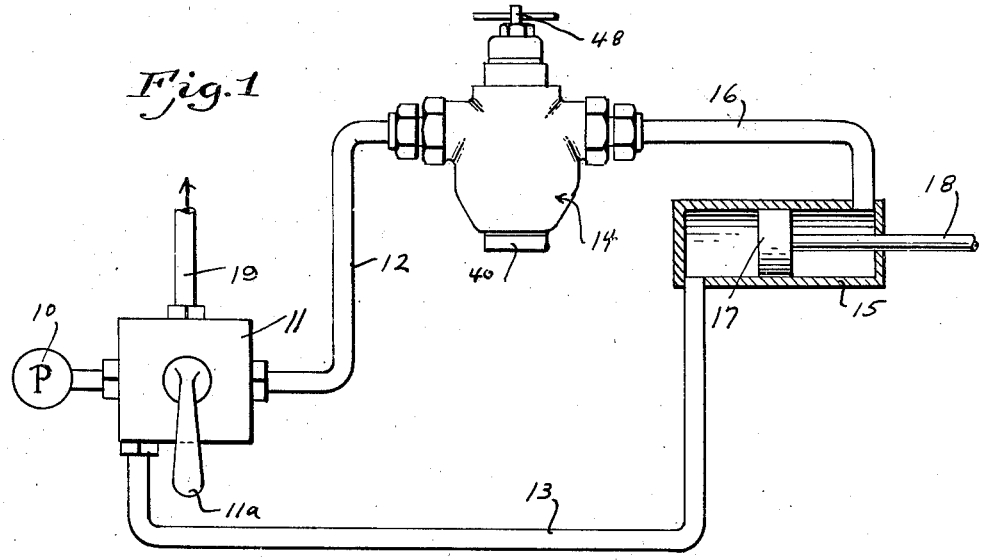
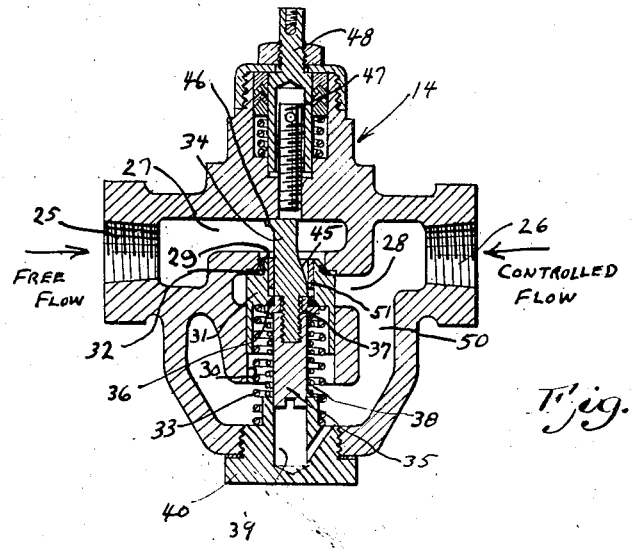
INVENTOR.
Roy D. McLeod
BY Barnes, Kisselle, Laughlin & Raisch
Attorneys.

Dec. 26, 1944.   R. D. McLEOD   2,365,892
SPEED CONTROL VALVE
Filed June 14, 1943   2 Sheets-Sheet 2

INVENTOR.
Roy D. McLeod
BY Barnes, Kisselle, Laughlin & Raisch
Attorneys.

Patented Dec. 26, 1944

2,365,892

UNITED STATES PATENT OFFICE 2,365,892

SPEED CONTROL VALVE

Roy D. McLeod, Detroit, Mich., assignor to Ross Operating Valve Company, Detroit, Mich., a corporation of Michigan Application June 14, 1943, Serial No. 490,732

6 Claims. (Cl. 277—44)

This invention relates to a speed control valve for air circuits. Generally speaking, it is desirable to have a speed control valve which, for a definite adjustment, gives a definite time control of a movable member such as an air operated piston. This ideal control has, however, been difficult to obtain. The fine adjustments necessary sometimes are difficult to maintain due to dirt and sediment that lodge in the valves. Similarly, a valve may give good control for a limited adjustment and then become unpredictable for the remainder of the adjustments.

The present invention contemplates an air speed control valve which has a performance curve as near to ideal as is believed to have been obtained. It is an object of the invention to provide a speed control valve which is not subject to variations due to foreign objects being ledged in the valve.

It is another object to provide a speed control valve which has a high accuracy as compared with the standard valve in use today, and which will afford speed control over longer periods. It is another object to provide a speed control valve which can be so operated as to provide speed control in one direction and free flow in another, or free flow in both directions.

Other objects and features of the invention having to do with details of the construction and operation will be brought out in the following specification and claims.

In the drawings:

Fig. 1 illustrates a circuit in which the valve member is located.

Fig. 2 illustrates a sectional view showing the details of construction.

Figure 3:
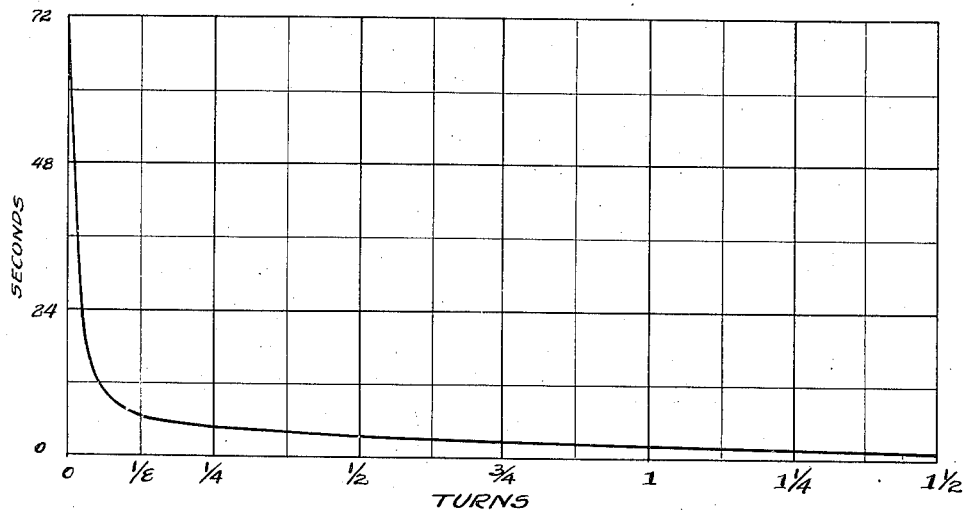
Fig. 3 is a graph illustrating a normal operation curve for a standard valve in use today.

In the drawings a pump is shown at 10 with a conduit leading to a directional valve 11. Conduits 12 and 13 lead from valve 11 to a speed contol valve 14 and a motor 15, respectively. A conduit 16 connects the speed control valve to the other end of the motor 15. Motor 15 is an air motor having a piston 17 and rod 18. Pipe 19 from valve 11 is an atmospheric connection.

This valve 10 has two openings 25 and 26 on opposite sides of the housing. Passages 27 and 28 within the valve connect the openings 25 and 26 through a valve seat 29. Slidably located in a bore 30 is a main check valve 31 having contact surfaces 32 which cooperate with valve seat 29. A spring 33 urges this valve 31 to closed position.

Slidably located in valve 31 is a supplemental core valve 34. The core valve consists of a member marked 34 which is threaded into a sliding piece 35. A second valve seat 36 is formed in the body of valve 31 and a member 37 mounted between members 34 and 35 cooperates with the valve seat 36. A spring 38 lighter than spring 33 urges the valve seat 37 to its seat. Slide 35 works in a bore 39 in a locating and guiding plug 40. Part 34 of the core valve has the surface 45 which is ground to the shape shown. This surface tapers gradually from the outer cylindrical surface of the valve toward the center of the valve.

A projection 46 is provided on the tip of part 34. This projection is arranged to contact the top of valve 31 when part 34 has been moved downwardly a sufficient amount by an adjusting screw 47. The adjusting screw is actuated by member 48 arranged in rotatable and sealing relation with the main valve housing. It will be seen that this main valve housing has a passage 50 which connects passage 28 with the back of valve 31 and thus with valve seat 36.

In the operation, when parts are positioned as shown in Figure 2, compressed air entering the valve 14 at opening 25 will open both part 34 and 31 against the respective backing springs 38 and 33. Spring 38 being lighter than spring 33 will tend to open first, thus regardless of the adjustment of the parts there will always be a relative movement between parts 34 and 31 freeing any dirt particles that tend to lodge in the opening by them. The main passage of air through the valve from port 25 would be through passages 27 and 28, although some would pass through passage 50.

If the valve is in the system shown in Figure 1, this free flow would tend to urge piston 17 to the left. Upon shifting the valve handle 11a of valve 11, which is a conventional control valve, a pressure can be directed to the left end of cylinder 15 whereby air will be forced back through pipe 16 to opening 26 of valve 14. Upon stoppage of flow into port 25, valves 34 and 31 will close. Flow into port 26 will be impossible as the parts are shown in Figure 2. However, for controlled back flow the member 48 may be screwed downwardly a predetermined number of turns. This will shift member 34 relative to member 31, thus opening valve seat 36 and causing air to flow through the restricted opening between the valve suface 45 of valve 34 and the cylindrical opening in valve 31 formed by a collar 51. The rate of flow through the opening thus formed is controlled by the relative position of parts 34 and 31.

By grinding the surface 45 accurately in a taper from the outer surface to a point adjacent the axis, the air flow can be accurately controlled. The amount of taper depends on the pitch of the threads of member 47 since each turn of the thread is arranged to open the valve a predetermined amount. Likewise, when member 47 is shifted to the point where the tip 46 contacts the upper edge of valve 31, the opening around the valve 34 is a maximum opening having a definite relation to the opening around valve seat 29 upon the next turn of the member 47.

In other words, let us assume that tip 46 contacts valve 31 at the end of the 5th turn. Then the difference between the areas at the end of the 4th turn and the end of the 5th turn should be substantially equal to the total open area available at valve seat 29 and valve 45 when member 47 is moved through the 6th turn. This will maintain a definite flow characteristic as the valve 31 comes into action.

It has been found that the entire range of an air flow valve cannot be controlled by a tapered surface alone and at some point there must be a larger opening for accurate control of the faster operations. There is, therefore, in the present disclosure, a definite relationship between the two parts 34 and 31 as far as flow characteristics are concerned in the adjustment, and likewise, the relative movement between the two parts during free flow insures that the valve used for fine control is free of obstruction and therefore reliable in action.

Figure 4:
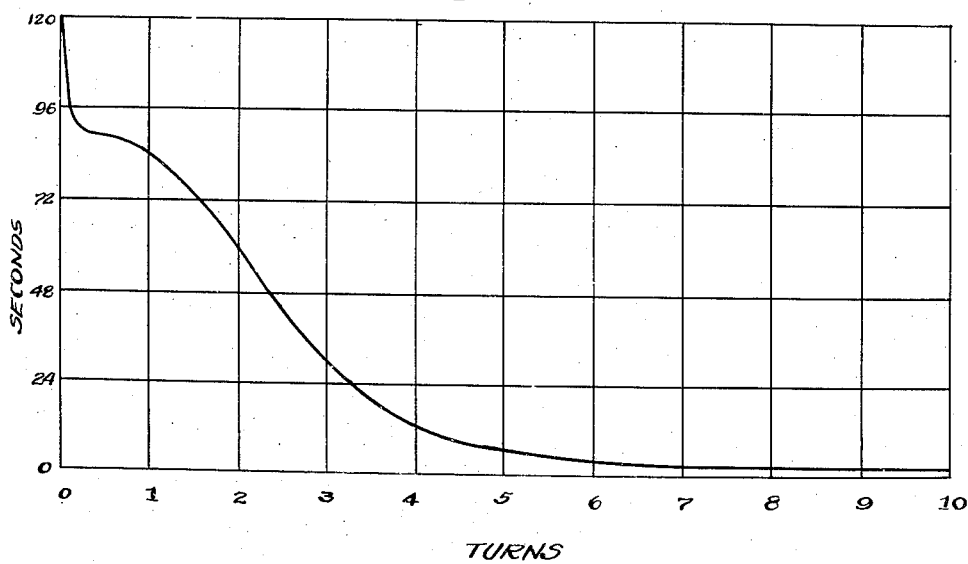
Fig. 4 shows approximately the operation curve of the described invention.

Figure 4 illustrates the marked improvement which the valve of Figure 2 provides over the regular needle valve type of control. Even with a very fine control, as shown in Figure 3, where the turns of the thread are manipulated to ⅛, ¼, ½, etc., turns of the control thread, the longest period of dwell is 72 seconds; whereas, with the presently disclosed device, control up to 120 seconds has been possible with a gradually decreasing curve, as shown, with the increase in the opening adjustment from 1 to 10 turns.

I claim:

1. In a speed control valve for fluid operating systems, a housing having inlet and outlet ports and valve members interposed in said housing between said ports comprising a main one-way biased valve closing a passage between said ports, and a supplemental valve mounted in said main valve closing another passage between said ports, means in said housing for adjusting the position of the supplemental valve with respect to said main valve and for adjusting the position of the main valve with respect to its seat.

2. In a speed control valve for fluid operating systems, a housing having inlet and outlet ports and valve members interposed in said housing between said ports comprising a main one-way biased valve closing a passage between said ports, a supplemental valve mounted in said main valve and having a varying contour for causing variable openings in said main valve, and a single regulation means operating upon movement thereof to open to a predetermined degree said supplemental valve, and upon further movement said main valve for controlled air flow through said valve.

3. In a speed control valve for fluid operating systems, a housing having inlet and outlet ports and valve members interposed in said housing between said ports comprising a main valve and supplemental valve supported thereby, each independently biased to closed position, the main valve having the greater bias, means on said supplemental valve for providing regular variations in an opening through said main valve upon predetermined relative axial movement between said valves, and means for shifting said valves first relatively and secondly concurrently to provide regular variations in flow restriction through said housing.

4. In a speed control valve for fluid operating systems, a housing having inlet and outlet ports and valve members interposed in said housing between said ports comprising a main valve and a supplemental valve supported thereby, each independently biased to permit free flow against the bias, the main valve having the greater bias, and means on said supplemental valve for causing flow restriction in the direction of said bias to a degree dependent upon the relative axial positions of said valves.

5. In a speed control valve for fluid operating systems, a housing having inlet and outlet ports and valve members interposed in said housing between said ports comprising a main one-way biased valve closing a passage between said ports, a valve passage through said main valve and a valve seat formed at one end thereof, and a supplemental valve mounted in said main valve having a portion positioned to cooperate with said seat and another portion arranged to restrict said valve passage in varying degrees depending on the relative position of said main and supplemental valves, and means in said housing for adjusting the position of the supplemental valve with respect to said main valve.

6. In a speed control valve for fluid operating systems, a housing having inlet and outlet ports and valve members interposed in said housing between said ports comprising a main valve provided with a valve passage and seat, and a supplemental valve supported thereby having portions to cooperate with the valve passage and the valve seat in the main valve, each of said valves being independently biased to permit free flow against the bias, the main valve having the greater bias, one of the portions on the supplemental valve being shaped to cause flow restriction through the main valve in a direction against the bias to a degree dependent upon the relative axial position of the valves.

ROY D. McLEOD.